(12) United States Patent
Ang

(10) Patent No.: US 8,810,206 B2
(45) Date of Patent: Aug. 19, 2014

(54) ELECTRIC MOTORED VEHICLE AND METHOD FOR CONTROLLING ELECTRICALLY CHARGING THE SAME

(75) Inventor: Wanleng Ang, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 59 days.

(21) Appl. No.: 13/497,163

(22) PCT Filed: Jul. 22, 2010

(86) PCT No.: PCT/JP2010/062322
§ 371 (c)(1),
(2), (4) Date: Mar. 20, 2012

(87) PCT Pub. No.: WO2012/011176
PCT Pub. Date: Jan. 26, 2012

(65) Prior Publication Data
US 2013/0106365 A1    May 2, 2013

(51) Int. Cl.
*H02J 7/00* (2006.01)
*B60L 11/18* (2006.01)
*H02M 3/158* (2006.01)
*H02M 1/42* (2007.01)
*H02J 7/02* (2006.01)
*B60L 3/00* (2006.01)

(52) U.S. Cl.
CPC ........... *H02J 7/0055* (2013.01); *B60L 11/1811* (2013.01); *Y02T 10/7088* (2013.01); *H02M 3/158* (2013.01); *Y02T 90/127* (2013.01); *Y02T 90/14* (2013.01); *H02M 1/4225* (2013.01); *H02J 7/022* (2013.01); *Y02T 10/7005* (2013.01); *B60L 3/0069* (2013.01)
USPC ......................................... 320/138; 320/104

(58) Field of Classification Search
USPC ....................................................... 320/138
See application file for complete search history.

(56) References Cited

U.S. PATENT DOCUMENTS 4,296,296 A * 10/1981 Eichelberger et al. ........ 219/715
5,710,502 A * 1/1998 Poumey ........................ 320/108
5,726,551 A * 3/1998 Miyazaki et al. ............. 320/124
(Continued)

FOREIGN PATENT DOCUMENTS

JP    A-8-88908     4/1996
JP    A-2009-225568   10/2009
(Continued)

OTHER PUBLICATIONS

Aug. 31, 2010 International Search Report issued in International Patent Application No. PCT/JP2010/062322 (with translation).

*Primary Examiner* — Arun Williams
(74) *Attorney, Agent, or Firm* — Oliff PLC

(57) ABSTRACT

A charger (200) electrically charges a main battery via (10) an electric power conversion path extending through an isolation transformer (260) and providing electrical isolation between an external power supply (400) and the main battery (10) when first and second relays (RL1, RL2) are turned off and a relay (RL3) is turned on. In contrast, the charger (200) electrically charges the main battery (10) via an electric power conversion path bypassing the isolation transformer (260) and providing electrical connection between the external power supply (400) and the main battery (10) when the first and second relays (RL1, RL2) are turned on and the third relay (RL3) is turned off. The charger (200) can thus selectively apply employing the isolation transformer (260) to ensure electrical isolation in externally electrically charging the battery, and bypassing the isolation transformer (260) to give priority to high efficiency in externally electrically charging the battery, as the relays (RL1-RL3) are turned on/off as controlled.

15 Claims, 7 Drawing Sheets

(56) References Cited

U.S. PATENT DOCUMENTS

| | | | |
|---|---|---|---|
| 7,178,513 B2* | 2/2007 | Ward | 123/634 |
| 8,030,882 B2* | 10/2011 | Ito et al. | 320/104 |
| 2010/0116571 A1 | 5/2010 | Suzuki | |
| 2010/0156346 A1* | 6/2010 | Takada et al. | 320/108 |
| 2011/0031927 A1* | 2/2011 | Kajouke et al. | 320/108 |
| 2011/0187184 A1 | 8/2011 | Ichikawa | |
| 2012/0056580 A1* | 3/2012 | Kai et al. | 320/108 |
| 2012/0126742 A1* | 5/2012 | Reggio et al. | 320/104 |
| 2012/0126777 A1* | 5/2012 | Motegi | 323/311 |
| 2012/0323423 A1* | 12/2012 | Nakamura et al. | 701/22 |

FOREIGN PATENT DOCUMENTS

| | | |
|---|---|---|
| JP | A-2009-225587 | 10/2009 |
| JP | A-2009-274479 | 11/2009 |
| JP | A-2010-81734 | 4/2010 |
| WO | WO 2009/028520 A1 | 3/2009 |
| WO | WO 2010/061465 A1 | 6/2010 |
| WO | WO 2010/067417 A1 | 6/2010 |
| WO | WO 2010/070761 A1 | 6/2010 |

* cited by examiner

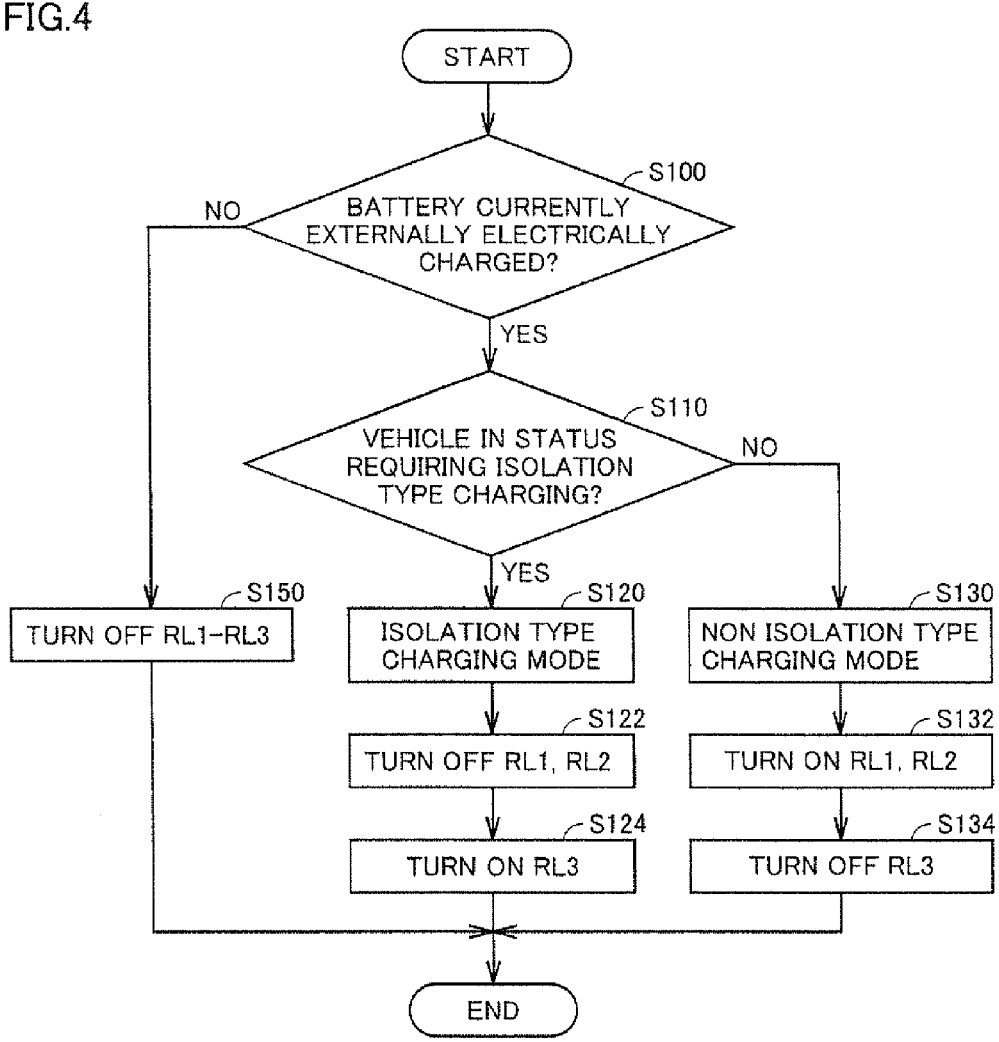

|  | PFC210 | INVERTER 250 | CONVERTER 270 | RL1,RL2 |
|---|---|---|---|---|
| ISOLATION TYPE CHARGING | vdc > vb ALLOWED | DC (vdc) → AC CONVERSION | AC → DC CONVERSION | OFF |
| NON ISOLATION TYPE CHARGING | CONTROL REQUIRED TO PROVIDE vdc = vb | STOP (BYPASS) | STOP (BYPASS) | ON |

ELECTRIC MOTORED VEHICLE AND METHOD FOR CONTROLLING ELECTRICALLY CHARGING THE SAME

TECHNICAL FIELD

The present invention relates generally to electric motored vehicles and methods for controlling electrically charging the same and particularly to systems employing a power supply external to a vehicle to electrically charge a power storage device mounted in the vehicle and methods for controlling the same.

BACKGROUND ART

Some electric vehicles, hybrid vehicles and similar electric motored vehicles employ the electric power of a power storage device, represented by a secondary battery, to drive a vehicle driving electric motor. For such vehicles, there is proposed a configuration employing a power supply external to the vehicle (hereinafter also simply referred to as an "external power supply") to electrically charge the power storage device mounted on the vehicle. Hereinafter, employing an external power supply to electrically charge a power storage device will also be referred to as "externally electrically charging" or the like.

For example, Japanese Patent Laying-Open No. 8-88908 (PTL 1) describes electrically charging a vehicle-mounted battery from a commercial power supply via an isolation transformer. PTL 1 describes that a battery charger is configured with a component also serving as that of an inverter controlling a vehicle driving electric motor.

Furthermore, Japanese Patent Laying-Open No. 2009-274479 (PTL 2) also describes a configuration including an isolation transformer 330 as a charger for electrically charging a vehicle-mounted power storage device from an external power supply.

Furthermore, Japanese Patent Laying-Open No. 2009-225587 (PTL 3) also describes a configuration employing an external power supply for externally electrically charging a main battery mounted on an electric motored vehicle. PTL 3 indicates a configuration in which a conduction path for electrically charging the main battery from the external power supply and a conduction path formed between the main battery and a vehicle driving electric motor when the vehicle travels are independent from each other.

CITATION LIST

Patent Literature

PTL 1: Japanese Patent Laying-Open No. 8-88908
PTL 2: Japanese Patent Laying-Open No. 2009-274479
PTL 3: Japanese Patent Laying-Open No. 2009-225587

SUMMARY OF INVENTION

Technical Problem

PTLs 1-3 illustrate a configuration including an isolation transformer for a charger receiving electric power from an external power supply and converting the received electric power to electric power to electrically charge a vehicle-mounted power storage device. Including the isolation transformer in the charger ensures that vehicle-mounted electronics are electrically isolated from the external power supply. In particular, when externally electrically charging the vehicle-mounted power storage device entails electrical connection between the vehicle-mounted power storage device and the vehicle-mounted electronics by a relay, the configuration ensures electrical isolation between the external power supply and the vehicle-mounted electronics, which is advantageous in terms of safety.

On the other hand, the isolation transformer provides electric power loss, and employing the charger including the isolation transformer may result in externally electrically charging the power storage device inefficiently.

The present invention has been made in view of the above disadvantage, and it contemplates an electric motored vehicle allowing a power storage device mounted in the vehicle to be electrically charged by an external power supply such that externally electrically charging the power storage device while electrical isolation is ensured, and externally electrically charging the power storage device without electrical isolation as efficiency is given priority, are selectively applicable to the vehicle, depending on the situation.

Solution to Problem

The present invention in an aspect provides an electric motored vehicle including: a power storage device for storing electric power input/output to/from a vehicle driving electric motor; and a charger for electrically charging the power storage device by an external power supply. The charger includes: a first electric power conversion path extending through an isolation scheme to provide electrical isolation between the external power supply and the power storage device, and receiving electric power from the external power supply and converting the received electric power through the isolation scheme to electric power to electrically charge the power storage device; a second electric power conversion path bypassing the isolation scheme and providing electrical connection between the external power supply and the power storage device, and receiving electric power from the external power supply and converting the received electric power to electric power to electrically charge the power storage device; and a first switch. The isolation scheme has a primary side and a secondary side and transmits electrical energy with the primary side and the secondary side electrically isolated from each other. The first switch is provided to selectively form one of the first electric power conversion path and the second electric power conversion path in externally electrically charging the power storage device.

Preferably, the electric motored vehicle further includes: an electrical load operating on electric power of the power storage device; and a second switch connected between the power storage device and the electrical load. The charger selects one of the first electric power conversion path and the second electric power conversion path, as corresponding to the second switch being turned on/off.

Still preferably, the first switch is controlled to allow the charger to have the first electric power conversion path selected when the second switch is turned on and to have the second electric power conversion path selected when the second switch is turned off.

Preferably, the isolation scheme is configured of an isolation transformer transmitting electrical energy between the primary side and the secondary side through electromagnetic induction.

Still preferably, the charger further includes a first power converter, a second power converter, a third power converter, and a smoothing inductor. The first power converter is configured to receive electric power from the external power supply and convert the received electric power to direct current voltage for output between a first power supply line and a first ground line. The second power converter is configured to convert the direct current voltage to alternate current voltage for output to the isolation transformer at the primary side when the first electric power conversion path is selected. The third power converter is configured to convert alternate current voltage of the isolation transformer on the secondary side to voltage for output between a second power supply line and a second ground line to electrically charge the power storage device when the first electric power conversion path is selected. The smoothing inductor is connected between the second power supply line and the power storage device. The second power converter and the third power converter are each configured with a plurality of switching devices included therein. The third power converter does not operate when the second electric power conversion path is selected. When the second electric power conversion path is selected, the second power converter operates such that some of the plurality of switching devices and the smoothing inductor configure a non isolation type chopper circuit receiving the direct current voltage from the first power converter and converting the direct current voltage to voltage applied to electrically charge the power storage device.

Still preferably, the first switch has a first switch element, a second switch element, and a third switch element. The first switch element is connected between the primary side of the isolation transformer and the second power supply line. The second switch element is connected between the first ground line and the second ground line. The third switch element is inserted and thus connected in a conduction path associated with the primary side of the isolation transformer. The first switch element and the second switch element are turned off when the first electric power conversion path is selected, and the first switch element and the second switch element are turned on when the second electric power conversion path is selected. The third switch element is turned on when the first electric power conversion path is selected, and the third switch element is turned off when the second electric power conversion path is selected.

Alternatively, still preferably, the first switch has a first switch element, a second switch element, and a third switch element. The first switch element is connected between one line associated with the primary side of the isolation transformer and the second power supply line. The second switch element is connected between the other line associated with the primary side of the isolation transformer and the second ground line. The third switch element is inserted and thus connected in a conduction path associated with the primary side of the isolation transformer. The first switch element and the second switch element are turned off when the first electric power conversion path is selected, and the first switch element and the second switch element are turned on when the second electric power conversion path is selected. The third switch element is turned on when the first electric power conversion path is selected, and the third switch element is turned off when the second electric power conversion path is selected. When the second electric power conversion path is selected, the second power converter operates to configure the non isolation type chopper circuit and also electrically connect the first ground line and the second ground line together.

Alternatively, still preferably, the charger further includes a first power converter, a second power converter, a third power converter, and a smoothing inductor. The first power converter is configured to receive electric power from the external power supply and convert the received electric power to direct current voltage in accordance with a voltage command value for output between a first power supply line and a first ground line. The second power converter is configured with a plurality of switching devices included therein so as to convert the direct current voltage to alternate current voltage for output to the isolation transformer at the primary side when the first electric power conversion path is selected. The third power converter is configured to convert alternate current voltage of the isolation transformer on the secondary side to voltage for output between a second power supply line and a second ground line to electrically charge the power storage device when the first electric power conversion path is selected. The smoothing inductor is connected between the second power supply line and the power storage device. When the second electric power conversion path is selected, the first switch electrically connects between the first power supply line and the second power supply line and between the first ground line and the second ground line. The second power converter and the third power converter do not operate when the second electric power conversion path is selected. When the second electric power conversion path is selected, the voltage command value for the first power converter is set to correspond to the voltage applied to electrically charge the power storage device.

In this configuration, in particular, the first switch has a first switch element and a second switch element. The first switch element is connected between the first power supply line and the second power supply line, and turned off when the first electric power conversion path is selected and turned on when the second electric power conversion path is selected. The second switch element is connected between the first ground line and the second ground line and turned off when the first electric power conversion path is selected and turned on when the second electric power conversion path is selected.

Alternatively, still preferably, the isolation scheme includes: a capacitor, a third switch, and a fourth switch. The third switch is provided between opposite polar terminals of the capacitor and the primary side. The fourth switch is provided between the opposite polar terminals of the capacitor and the secondary side.

Still preferably, the charger further includes a first power converter configured to receive electric power from the external power supply, convert the received electric power to direct current electric power and output the direct current electric power to the isolation scheme at the primary side for electrically charging the power storage device. The power storage device is electrically connected to the isolation scheme at the secondary side in externally electrically charging the power storage device. The first switch is arranged to bypass the third switch and the fourth switch to electrically connect the primary side of the isolation scheme and the secondary side of the isolation scheme together.

In this configuration, in particular, the first switch is fixed at an off state when the first electric power conversion path is selected, and the first switch is fixed at an on state when the second electric power conversion path is selected. The third switch is turned on/off alternately with and complementarily to the fourth switch when the first electric power conversion path is selected, and the third switch is fixed at the off state when the second electric power conversion path is selected. The fourth switch is turned on/off alternately with and complementarily to the third switch when the first electric power conversion path is selected, and the fourth switch is fixed at the off state when the second electric power conversion path is selected.

The present invention in another aspect provides a method for controlling an electric motored vehicle including a power storage device for storing electric power input/output to/from a vehicle driving electric motor, and a charger for electrically charging the power storage device by an external power supply. The charger is configured to have electric power conversion paths extending from the external power supply to the power storage device switched as a first switch is controlled. The method includes the steps of: selecting one of a first charging mode and a second charging mode depending on the electric motored vehicle's status, the first charging mode allowing the external power supply and the power storage device to be electrically isolated from each other in electrically charging the power storage device, the second charging mode allowing the external power supply and the power storage device to be electrically connected to each other in electrically charging the power storage device; when the first charging mode is selected, controlling the first switch to form a first electric power conversion path extending through an isolation scheme, and receiving electric power from the external power supply and converting the received electric power through the isolation scheme to electric power to electrically charge the power storage device, the isolation scheme having a primary side and a secondary side and transmitting electrical energy with the primary side and the secondary side electrically isolated from each other; and when the second charging mode is selected, controlling the first switch to form a second electric power conversion path bypassing the isolation scheme, and receiving electric power from the external power supply and converting the received electric power to electric power to electrically charge the power storage device.

Preferably, the electric motored vehicle further includes an electrical load operating on electric power of the power storage device and a second switch connected between the power storage device and the electrical load, and the step of selecting is performed to select one of the first charging mode and the second charging mode, as corresponding to the second switch being turned on/off.

Alternatively, preferably, the step of selecting is performed to select the first charging mode when the second switch is turned on and to select the second charging mode when the second switch is turned off.

Advantageous Effects Of Invention

The present invention can thus provide an electric motored vehicle allowing a power storage device mounted in the vehicle to be electrically charged by an external power supply such that externally electrically charging the power storage device while electrical isolation is ensured, and externally electrically charging the power storage device without electrical isolation as efficiency is given priority, are selectively applicable to the vehicle, depending on the situation.

BRIEF DESCRIPTION OF DRAWINGS

FIG. 4 is a flowchart for illustrating how a charger is controlled in the electric motored vehicle according to the first embodiment of the present invention.

FIG. 5 illustrates how the charger in the electric motored vehicle of the first embodiment operates when a power storage device is externally electrically charged.

DESCRIPTION OF EMBODIMENTS

Hereinafter reference will be made to the drawings to describe the present invention in embodiments. In the figures, identical or corresponding components are identically denoted and will not be described repeatedly in detail.

First Embodiment

Figure 1:
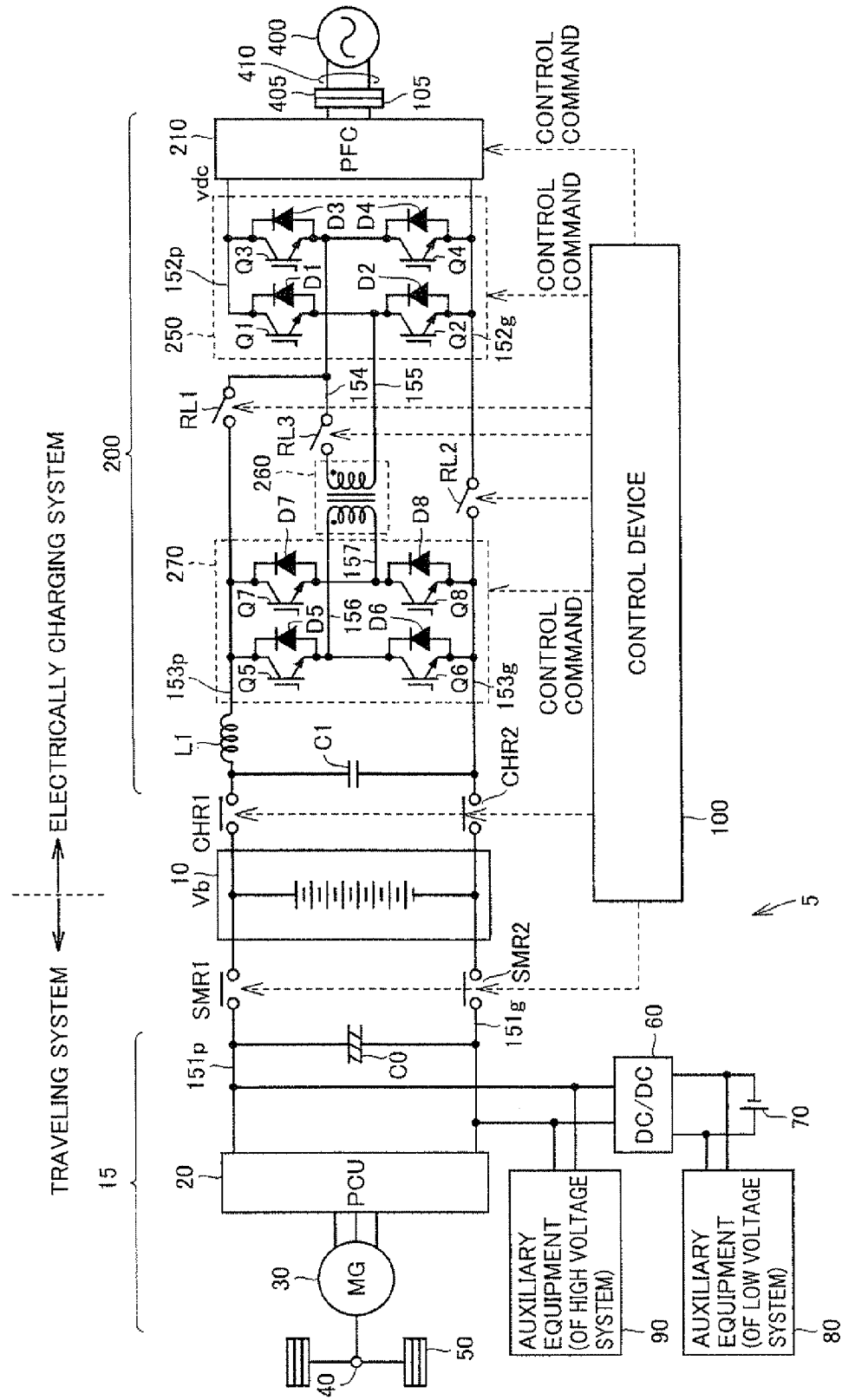
FIG. 1 is a block diagram of a configuration of an electrical system of an electric motored vehicle according to a first embodiment of the present invention.

FIG. 1 is a block diagram of a configuration of an electrical system of an electric motored vehicle according to a first embodiment of the present invention.

With reference to FIG. 1, an electric motored vehicle 5 includes a main battery 10, an electrical load 15, system main relays SMR1, SMR2, and a control device 100.

Control device 100 indicates that function of those controlling equipment mounted in electric motored vehicle 5 which relates to controlling in externally electrically charging a power storage device, as relating to the present embodiment. Note that control device 100 can be configured to achieve the above function by a predetermined operation process done by executing a program stored in an incorporated memory (not shown), a predetermined operation process done by an electronic circuit or similar hardware, and/or the like.

Main battery 10 is indicated as a representative example of a "power storage device" and is representatively a lithium ion battery, a nickel metal hydride battery or a similar secondary battery. For example, main battery 10 outputs a voltage of approximately 200 V. Alternatively, an electric double layer, or a secondary battery and a capacitor in combination, or the like may configure the "power storage device".

Electrical load 15 collectively indicates a group of electronics operating on the electric power of main battery 10. Electrical load 15 includes an electric power control unit (PCU) 20, a motor generator 30, a DCDC converter 60, an auxiliary battery 70, auxiliary equipment 80 for a low voltage system, and auxiliary equipment 90 for a high voltage system.

System main relay SMR1 is connected between a positive terminal of main battery 10 and a power supply line 151$p$. System main relay SMR2 is connected between a negative terminal of main battery 10 and a ground line 151$g$. System main relays SMR1, SMR2 are turned on/off (or switched on/off), as controlled by control device 100. System main relays SMR1, SMR2 correspond to a "second switch". Between power supply line 151$p$ and ground line 151$g$ a smoothing capacitor C0 is connected.

Power supply line 151$p$ receives electric power from main battery 10 and transmits the received electric power to PCU 20 which in turn converts the received electric power to electric power for controlling motor generator 30 in driving it. For example, motor generator 30 is a permanent magnet, 3-phase synchronous electric motor, and PCU 20 is configured by a 3-phase inverter. Alternatively, PCU 20 may be configured by a combination of a converter variably controlling the voltage output from main battery 10 and a 3-phase inverter converting the converter's output voltage to alternate current voltage.

Motor generator 30 outputs a torque which is in turn transmitted via a power transmission gear 40 that is configured of a speed reducer, a power split device and the like to a driving wheel 50 to cause electric motored vehicle 5 to travel.

When electric motored vehicle 5 is regeneratively braked, motor generator 30 can generate electric power by the rotary force of driving wheel 50. The generated electric power is then converted by PCU 20 to electric power and output between power supply line 151$p$ and ground line 151$g$ for electrically charging main battery 10.

Furthermore, when electric motored vehicle 5 is a hybrid vehicle having motor generator 30 and in addition an engine (not shown) mounted therein, the engine and motor generator 30 can cooperatively be operated to generate required power to drive electric motored vehicle 5. In doing so, the engine's rotation can also be utilized to generate electric power to electrically charge main battery 10. In other words, electric motored vehicle 5 generally indicates a vehicle having an electric motor mounted therein for generating power to drive the vehicle, and it includes a hybrid vehicle generating power by an engine and an electric motor to drive the vehicle, an electric vehicle which does not have an engine mounted therein, a fuel cell vehicle and the like.

Auxiliary equipment 90 is driven by a direct current voltage between power supply line 151$p$ and ground line 151$g$, i.e., voltage output from main battery 10. For example, auxiliary equipment 90 includes an inverter for driving a compressor of an air conditioner (not shown).

DCDC converter 60 down-converts direct current voltage between power supply line 151$p$ and ground line 151$g$, i.e., voltage output from main battery 10, to a level in voltage to electrically charge auxiliary battery 70. DCDC converter 60 is configured by a typical switching regulator.

Auxiliary battery 70 is for example a lead-acid battery and electrically charged by voltage output from DCDC converter 60. Auxiliary battery 70 has a voltage lower than that output from main battery 10. It is for example approximately 12 V.

Auxiliary equipment 80 is driven by voltage output from DCDC converter 60 and/or that output from auxiliary battery 70. For example, auxiliary equipment 80 includes audio equipment, navigation equipment, illumination equipment (e.g., a hazard lamp, a room light, a head lamp and the like), and the like. Furthermore, auxiliary equipment 80 includes an electric motored power steering mechanism, an electric motored oil pump, an electronics controlling small motor, or a similar auxiliary for a traveling system directly employed when the vehicle travels. Furthermore, each electronic control unit (ECU) (not shown), including control device 100, also operates on voltage output from auxiliary battery 70.

System main relays SMR1, SMR2, when electric motored vehicle 5 travels, are turned on to use the electric power of main battery 10 to operate electrical load 15 including motor generator 30 and auxiliary equipment 80 and 90.

Electric motored vehicle 5 includes a traveling system that is a general configuration for causing the vehicle to travel, and in addition, an electrically charging system for externally electrically charging main battery 10 (or a power storage device). More specifically, electric motored vehicle 5 further includes charging relays CHR1, CHR2, a charging connector 105, and a charger 200 as the electrically charging system.

Charging connector 105 is configured to be connectable to a charging connector 405 of a charging cable 410. An external power supply 400 is representatively a system power supply. In externally electrically charging main battery 10, external power supply 400 is connected to a charging plug (not shown) of charging cable 410, and furthermore, the charging cable 410 charging connector 405 is connected to the electric motored vehicle 5 charging connector 105. The electric power of external power supply 400 is thus supplied to the electric motored vehicle 5 charging connector 105. Charging connector 105 is configured to have such a function that when charging connector 105 is electrically connected to external power supply 400, charging connector 105 notifies control device 100 accordingly.

Charging relays CHR1, CHR2 are connected between charger 200 and main battery 10.

Charger 200 includes an AC-DC converter 210, a DC-AC converter 250, an isolation transformer 260, an AC-DC converter 270, a smoothing inductor L1 and a smoothing capacitor C1.

AC-DC converter 210 receives alternate current electric power transmitted from external power supply 400 to charging connector 105, converts the received alternate current electric power to direct current electric power (direct current voltage vdc), and outputs the direct current electric power on power supply line 152$p$ and ground line 152$g$. Preferably, AC-DC converter 210 outputs voltage vdc, as controlled in response to a control command issued from control device 100. Furthermore, AC-DC converter 210 is preferably provided as a power factor correction (PFC) circuit for improving a power factor in AC-DC conversion. AC-DC converter 210 is configured, as will more specifically be described hereinafter by way of example.

DC-AC converter 250 has a full bridge circuit configured of power semiconductor switching devices Q1-Q4. In the present embodiment, the power semiconductor switching device (hereinafter also simply referred to as a "switching device") is indicated as an isolated gate bipolar transistor (IGBT) by way of example. It may be, however, a power metal oxide semiconductor (power MOS) transistor, a power bipolar transistor or any similar switching device controllable to be turned on/off. Switching devices Q1-Q4 are associated with antiparallel diodes D1-D4, respectively.

DC-AC converter 250 converts direct current voltage vdc to alternate current voltage and outputs it between lines 154 and 155 connected to isolation transformer 260 at a primary side. Hereinafter, DC-AC converter 250 will also be referred to as an inverter 250.

Isolation transformer 260 has the primary side connected to lines 154 and 155 and a secondary side connected to lines 156 and 157. As is well known, isolation transformer 260 electrically isolates the primary and secondary sides, and in that condition, transmits electrical energy between the primary and secondary sides through electromagnetic induction. In other words, isolation transformer 260 configures an "isolation scheme".

AC-DC converter 270 has a full bridge circuit configured of switching devices Q5-Q8. Switching devices Q5-Q8 have antiparallel diodes D5-D8 connected thereto, respectively. AC-DC converter 270 converts alternate current voltage between lines 156 and 157 to a direct current voltage Vb corresponding to voltage applied to electrically charge main battery 10 and outputs direct current voltage Vb between a power supply line 153$p$ and a ground line 153$g$. Hereinafter, AC-DC converter 270 will also be referred to as a converter 270.

Smoothing inductor L1 is connected between power supply line 153p and the positive terminal of main battery 10. Smoothing capacitor C1 is electrically connected between power supply line 153p and ground line 153g. In other words, main battery 10 is electrically charged with a voltage and a current having a high frequency component removed therefrom by smoothing capacitor C1 and smoothing inductor L1.

Charger 200 is provided with relays RL1-RL3. Relays RL1-RL3 are turned on/off, as controlled by control device 100. Relays RL1-RL3 are arranged to control switching between an electric power conversion path in an "isolation type charging mode" and an electric power conversion path in a "non isolation type charging mode", as will be described more specifically hereinafter. In other words, relays RL1-RL3 configure a "first switch". Furthermore, relays RL1, RL2 and RL3 correspond to a "first switch element", a "second switch element", and a "third switch element", respectively.

The FIG. 1 exemplary configuration provides relay RL1 electrically connected between a line 154 associated with the primary side of isolation transformer 260 and power supply line 153p. Relay RL2 is electrically connected between a ground line 152g of inverter 250 and ground line 153g of converter 270. Relay RL3 is connected such that it is inserted in a conduction path associated with the isolation transformer 260 primary side and electrically connected to DC-AC converter 250 (i.e., in lines 154 and 155).

In FIG. 1, AC-DC converter (or PFC circuit) 210 corresponds to a "first power converter", inverter 250 corresponds to a "second power converter", and converter 270 corresponds to a "third power converter". Furthermore, power supply line 152p corresponds to a "first power supply line" and power supply line 153p corresponds to a "second power supply line", and ground line 152g corresponds to a "first ground line" and ground line 153g corresponds to a "second ground line". Furthermore, the isolation type charging mode corresponds to a "first charging mode" and the non isolation type charging mode corresponds to a "second charging mode".

Figure 2:
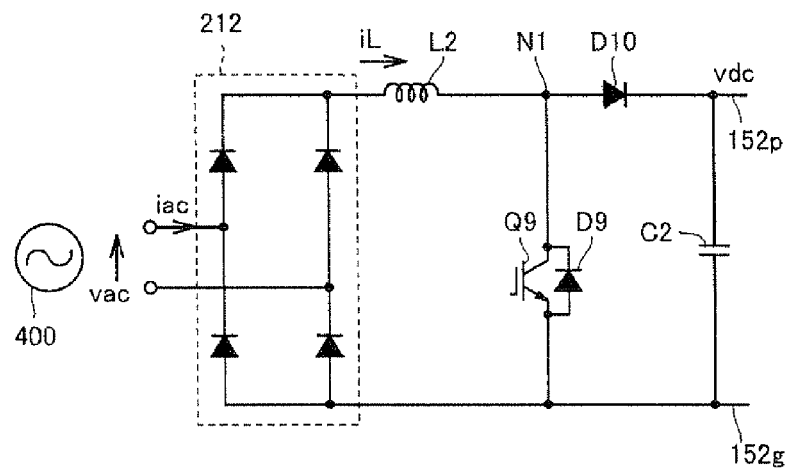
FIG. 2 is a circuit diagram showing an exemplary configuration of an AC-DC converter (a PFC circuit) shown in FIG. 1.

FIG. 2 is a circuit diagram showing AC-DC converter 210 in a preferable exemplary configuration. As shown in FIG. 2, AC-DC converter 210 is provided as PFC circuit 210 provided to improve a power factor of power supply voltage and power supply current received from external power supply 400.

With reference to FIG. 2, PFC circuit 210 includes a rectifier 212 configured of a diode bridge, an inductor L2, a switching device Q9 and an antiparallel diode D9, a diode D10, and a smoothing capacitor C2.

Rectifier 212 receives power supply voltage vac from external power supply 400, rectifies the received voltage and outputs the rectified voltage. Inductor L2 is connected between a positive output node of rectifier 212 and a node N1. Rectifier 212 has a negative output node connected to ground line 152g.

Switching device Q9 is electrically connected between node N1 and ground line 152g. Switching device Q9 is provided with antiparallel diode D9. Diode D10 is connected between node N1 and power supply line 152p such that diode D10 has a forward direction in a direction extending from node N1 toward power supply line 152p. Smoothing capacitor C2 is connected between power supply line 152p and ground line 152g.

Figure 3:
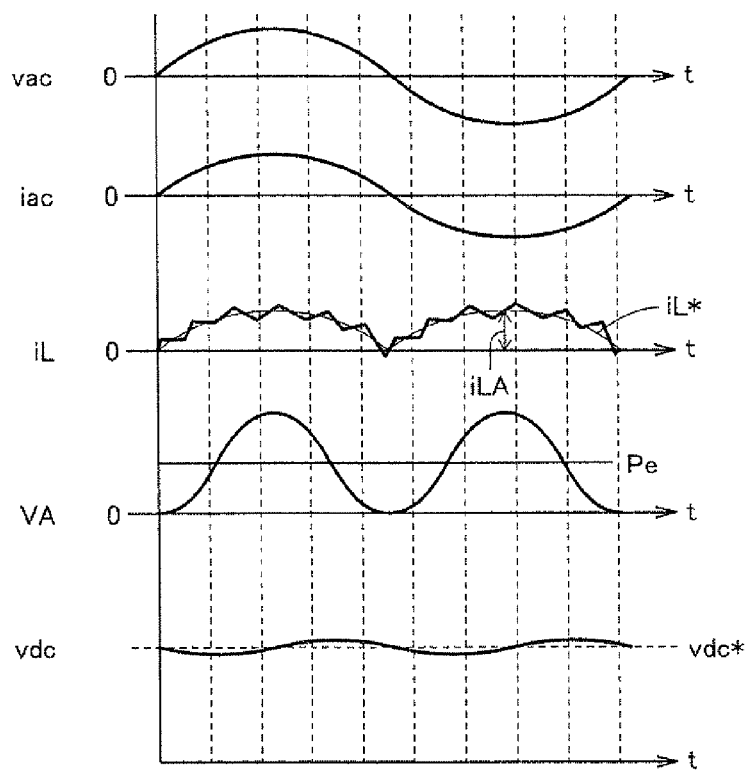
FIG. 3 is a waveform diagram for illustrating how the FIG. 2 PFC circuit operates.

Reference will now be made to FIG. 3 to describe how PFC circuit 210 operates. With reference to FIG. 3, external power supply 400 outputs power supply voltage vac, which is alternate current voltage of a predetermined frequency (hereinafter referred to as "the power supply frequency"). In PFC circuit 210, inductor L2 passes a current iL, which increases and decreases while switching device Q9 is turned on and off, respectively. Accordingly, controlling switching device Q9 in response to an output of a current sensor (not shown) that detects current iL to turn on/off switching device Q9 allows inductor L2 to pass current iL matched to a target current iL*.

Herein, target current iL* that is set at an absolute value of an alternate current electric current which is in phase with power supply voltage vac allows current iL to be controlled to provide a power supply current iac and power supply voltage vac in phase. This allows power supply current iac multiplied by power supply voltage vac, or an instantaneous electric power VA, to have a positive value constantly and hence a large average value or active power. In other words, this allows external power supply 400 to supply electric power having a power factor close to one.

Smoothing capacitor C2 is electrically charged by a current supplied via diode D10. Furthermore, smoothing capacitor C2 discharges a current which is in turn supplied to inverter 250 and used to electrically charge main battery 10. As it is thus electrically charged and discharged, smoothing capacitor C2 will have a voltage, or direct current voltage vdc, varying at a frequency twice the power supply frequency.

Herein, current iL has an integral corresponding to an electric charge supplied to smoothing capacitor C2, and direct current voltage vdc on power supply line 152p can be controlled depending on a magnitude (or amplitude) iLA of target current iL*. More specifically, as switching device Q9 is turned on/off to control current iL, PFC circuit 210 can control direct current voltage vdc in accordance with a voltage command value vdc*.

Again with reference to FIG. 1, when electric motored vehicle 5 travels, system main relays SMR1, SMR2 are turned on and charging relays CHR1, CHR2 are turned off. Electric motored vehicle 5 can thus employ the electric power of main battery 10 to operate each equipment of the traveling system including electrical load 15. On the other hand, when the vehicle travels, charging relays CHR1, CHR2 are turned off to allow the electrically charging system including charger 200 to be completely disconnected from main battery 10 and the traveling system.

Note that the vehicle starts to travel under a condition that charging cable 410 is not connected to charging connector 105, which ensures that when the vehicle travels, charging connector 105 does not have charging cable 410 connected thereto.

In contrast, when main battery 10 is external electrically charged, charging relays CHR1, CHR2 can be turned on to pass electric power from charger 200 to electrically charge main battery 10. On the other hand, when the vehicle is not traveling and the battery is not externally electrically charged, charging relays CHR1, CHR2 are turned off. System main relays SMR1, SMR2 are turned on or off depending on the vehicle's state, more specifically, the power consumption in the traveling system in response to the user's operation.

Control device 100 turns on system main relays SMR1, SMR2, depending on the user's operation or the operation (or power consumption) of auxiliary equipment 80, 90, even when the battery is externally electrically charged. For example, when auxiliary equipment 90 of the high voltage system such as an air conditioner or the like is required to operate or auxiliary equipment 80 of the low voltage system consumes larger electric power, system main relays SMR1, SMR2 are turned on.

FIG. 4 is a flowchart for illustrating how the charger in electric motored vehicle 5 is controlled according to the first embodiment of the present invention. The FIG. 4 flowchart is executed periodically when electric motored vehicle 5 is not traveling.

With reference to FIG. 4, control device 100 proceeds to step S100 to confirm whether the battery is currently externally electrically charged.

Step S100 is determined as YES when charging connector 105 has charging cable 410 connected thereto normally and charging main battery 10 is not completed. In contrast, step S100 is determined as NO when charging cable 410 is not connected or when charging cable 410 is connected and main battery 10 is not externally electrically charged in accordance with the user's instruction or depending on the battery's state of charge.

When the battery is not externally electrically charged (NO at S100), control device 100 turns off charging relays CHR1, CHR2 and proceeds to step S150 to turn off the charger 200 relays RL1-RL3. This cuts a path transmitting electric power from external power supply 400 to main battery 10, and main battery 10 is not electrically charged.

When the battery is externally electrically charged (YES at S100), control device 100 turns on charging relays CHR1, CHR2 and proceeds to step S110.

Control device 100 in step S110 selects a charging mode of external electrically charging. More specifically, control device 100 determines whether the vehicle is in a condition requiring the battery to be electrically charged in the isolation type charging mode. Representatively, the step S110 determination is made to correspond to system main relays SMR1, SMR2 being turned on/off when the battery is externally electrically charged. As has been described above, whether it is necessary to turn on system main relays SMR1, SMR2 can be determined for example from the user's instruction issued for operation for auxiliary equipment 80, 90, the auxiliary equipment 80, 90 power consumption and/or the like.

More specifically, when it is necessary to turn on system main relays SMR1, SMR2, control device 100 in step S110 makes a determination of YES and selects the isolation type charging mode (step S120). In contrast, when system main relays SMR1, SMR2 are turned off, control device 100 in step S110 makes a determination of NO and selects the non isolation type charging mode (step S130).

When control device 100 selects the isolation type charging mode, control device 100 proceeds to step S122 to turn off relays RL1, RL2 and proceeds to step S124 to turn on relay RL3. In contrast, when control device 100 selects the non isolation type charging mode, control device 100 proceeds to step S132 to turn on relays RL1, RL2 and proceeds to step S134 to turn off relay RL3.

With reference to FIG. 5 and FIG. 1, charger 200 operates in the isolation type charging mode, as will be described hereinafter.

In the isolation type charging mode, inverter 250 receiving direct current voltage vdc from AC-DC converter (PFC circuit) 210 converts direct current voltage vdc to alternate current voltage as switching devices Q1-Q4 are turned on/off as controlled, and inverter 250 outputs the alternate current voltage between lines 154 and 155 connected to the isolation transformer 260 primary side. As relays RL1, RL2 are turned off, electrical disconnection is provided between inverter 250 and converter 270. On the other hand, relay RL3 is turned on, and the alternate current voltage that inverter 250 has output to the isolation transformer 260 primary side is transmitted between lines 156 and 157 connected to the isolation transformer 260 secondary side.

Converter 270 receives the alternate current voltage output to the isolation transformer 260 secondary side (or on lines 156 and 157) and converts the alternate current voltage to direct current voltage as switching devices Q5-Q8 are turned on/off as controlled, and converter 270 outputs the direct current voltage on power supply line 153p. Switching devices Q5-Q8 are turned on/off as controlled such that via smoothing inductor L1 main battery 10 receives a direct current electric current or direct current voltage in accordance with a control command value.

Thus in the isolation type charging mode charger 200 receives electric power from external power supply 400 and converts the received electric power, through an electric power conversion path via an isolation transformer ensuring electrical isolation in transmitting electrical energy, to electric power to electrically charge main battery 10. As a result, while external power supply 400 is electrically isolated from main battery 10, the battery can still be externally electrically charged, and while system main relays SMR1, SMR2 are turned on, electrical isolation can be ensured between electrical load 15 and external power supply 400.

In the non isolation type charging mode, charger 200 operates as will be described hereinafter.

In the non isolation type charging mode, relays RL1, RL2 are turned on, and accordingly, inverter 250 bypasses the converter 270 switching devices Q5-Q8 and is electrically connected to power supply line 153p and ground line 153g. Converter 270 is stopped. That is, switching devices Q5-Q8 are fixed at the off state.

Furthermore, relay RL3 is turned off, and isolation transformer 260 has the primary side's conduction path cut. Isolation transformer 260 thus does not transmit electrical energy.

Furthermore, charger 200 operates such that, of switching devices Q1-Q4 configuring inverter 250, those switching devices connected via relay RL1 to smoothing inductor L1 (in FIG. 1, switching devices Q3, Q4) and smoothing inductor L1 configure a non isolation type chopper circuit. More specifically, of switching devices Q1-Q4, those unconnected to smoothing inductor L1 (in FIG. 1, Q1 and Q2) are fixed at the off state.

Charger 200 receiving direct current voltage vdc from AC-DC converter (or PFC circuit) 210 converts direct current voltage vdc, by the non isolation type chopper circuit having switching device Q3 as an upper arm and switching device Q4 as a lower arm, to voltage applied to electrically charge main battery 10 (or to the Vb level). For example, switching device Q3 and switching device Q4 can be complementarily switched on and off periodically and their on/off ratio (or duty ratio) controlled to control a voltage conversion ratio between direct current voltage vdc and voltage applied to electrically charge main battery 10.

Thus, in the non isolation type charging mode, charger 200 receives electric power from external power supply 400 and converts the received electric power to electric power via an electric power conversion path bypassing isolation transformer 260 and thus electrically connecting external power supply 400 to main battery 10 to electrically charge main battery 10. This can prevent isolation transformer 260 from causing a loss and thus allows the battery to be externally electrically charged more efficiently than in the isolation type charging mode. In particular, when system main relays SMR1, SMR2 are turned off to ensure electrical isolation between main battery 10 and electrical load 15, the non isolation type charging mode ensures electrical isolation between electrical load 15 and external power supply 400, and in that condition, allows the battery to be externally electrically charged more efficiently. Note that, as described above, direct current voltage vdc is set to be higher than the voltage of main battery 10 and charger 200 operates as a down converting chopper.

The first embodiment thus provides an electric motored vehicle that allows isolation transformer 260 (or an isolation scheme) to be passed through to provide an electric power conversion path ensuring electrical isolation in externally electrically charging a battery (i.e., the isolation type charging mode) and isolation transformer 260 (or the isolation scheme) to be bypassed to provide an electric power conversion path giving priority to high efficiency in externally electrically charging the battery (i.e., the non isolation type charging mode) to be selectively applicable thereto.

In particular, switching between the isolation type charging mode and the non isolation type charging mode, as ganged with system main relays SMR1, SMR2 being turned on/off to control electrical connection between main battery 10 and electrical load 15, ensures electrical isolation between vehicle-mounted electronics (or electrical load 15) and external power supply 400, and in that condition, allows the battery to be externally electrically charged efficiently.

Figure 6:
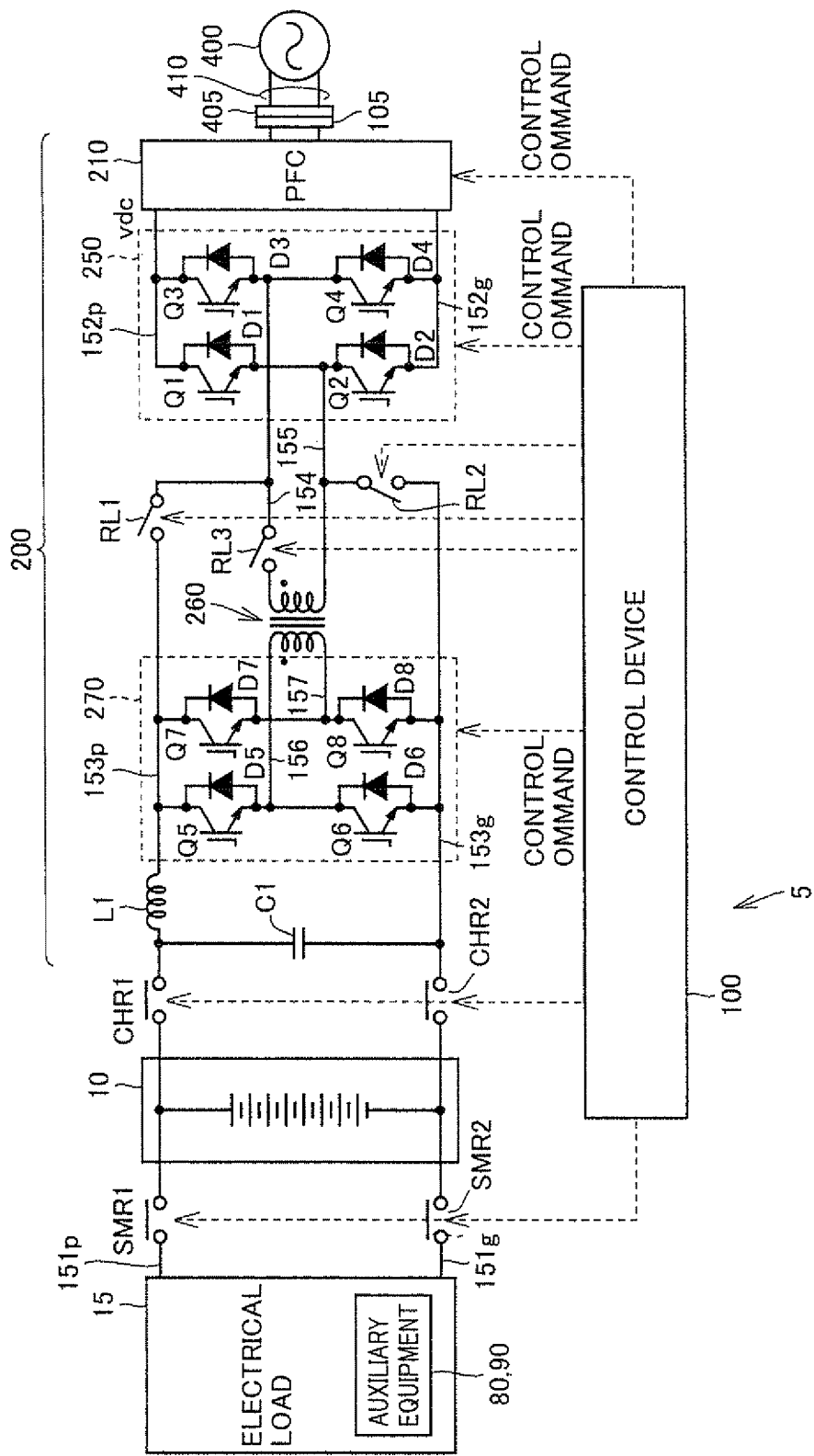
FIG. 6 is a block diagram of a configuration of an electrical system of an electric motored vehicle according to a variation of the first embodiment of the present invention.

Note that the FIG. 6 configuration can be modified to have relay RL1 connected between power supply line 153*p* and line 155. In that case, smoothing inductor L1 and switching devices Q3, Q4 can configure a non isolation type chopper circuit in the non isolation type charging mode.

First Embodiment in Exemplary Variation

FIG. 6 is a block diagram showing a configuration of an electrical system of an electric motored vehicle according to an exemplary variation of the first embodiment of the present invention.

When FIG. 6 is compared with FIG. 1, the first embodiment in the exemplary variation provides electric motored vehicle 5 having charger 200 with relay RL2 arranged to be different than the FIG. 1 configuration (or the first embodiment).

Relay RL1 is connected, as provided in the FIG. 1 configuration, i.e., between one line associated with the primary side of isolation transformer 260 (in FIG. 6, line 154) and power supply line 153*p*. In contrast, relay RL2 is connected between the other line associated with the primary side of isolation transformer 260 (in FIG. 6, line 155) and ground line 153*g*. Note that relay RL3 is provided, as done in the FIG. 1 configuration, i.e., inserted and thus connected in a conduction path associated with the primary side of isolation transformer 260. The FIG. 6 configuration has a remainder similar to that of the first embodiment (or FIG. 1), and accordingly, will not be described repeatedly in detail.

The first embodiment in the exemplary variation also provides electric motored vehicle 5 operating in the isolation type charging mode and the non isolation type charging mode with relays RL1-RL3, and inverter 250 and converter 270 operating basically similarly as described in the first embodiment with reference to FIG. 5.

More specifically, in the isolation type charging mode, relays RL1, RL2 are turned off and relay RL3 is turned on to form an electric power conversion path similar to that in the isolation type charging mode in FIG. 1. Main battery 10 is thus charged with electric power of external power supply 400.

In the non isolation type charging mode, relay RL3 is turned off whereas relays RL1, RL2 are turned on, similarly as described in the first embodiment. Furthermore, inverter 250 has fixed at the on state a switching device connected between ground lines 152*g* and 153*g* via relay RL2 (in the FIG. 6 example, switching device Q2). This forms an electric power conversion path, similarly as has been described with reference to FIG. 1 for the non isolation type charging mode, that includes a non isolation type chopper circuit configured of smoothing inductor L1 and upper and lower arms' switching devices (in the FIG. 6 example, switching devices Q3, Q4), similarly as has been described with reference to FIG. 1 for the isolation type charging mode. More specifically, main battery 10 is electrically charged with the electric power of external power supply 400 through an electric power conversion path providing electrical connection between external power supply 400 and main battery 10, with isolation transformer 260 bypassed.

The first embodiment in the exemplary variation (see FIG. 6) can also provide electric motored vehicle 5 enjoying an effect similar to that of the electric motored vehicle of the first embodiment.

Note that the first embodiment (FIG. 1) and its exemplary variation (FIG. 6) are configured such that the non isolation type charging mode also allows voltage vdc output from AC-DC converter 210 to be converted to voltage by a voltage conversion function that is ensured by a non isolation type chopper circuit to electrically charge main battery 10. Accordingly, if external power supply 400 has a peak voltage value ensured to be higher than the voltage applied to electrically charge main battery 10, it may not be necessary to control voltage output from AC-DC converter 210 (i.e., direct current voltage vdc). More specifically, even if AC-DC converter 210 is configured such that diode rectification or the like is employed to simply perform AC-DC conversion, the battery can be externally electrically charged in the non isolation type charging mode.

Furthermore, the FIG. 6 configuration may be modified to have relay RL1 connected between power supply line 153*p* and line 155 and relay RL2 connected between ground line 153*g* and line 154.

Second Embodiment

Figure 7:
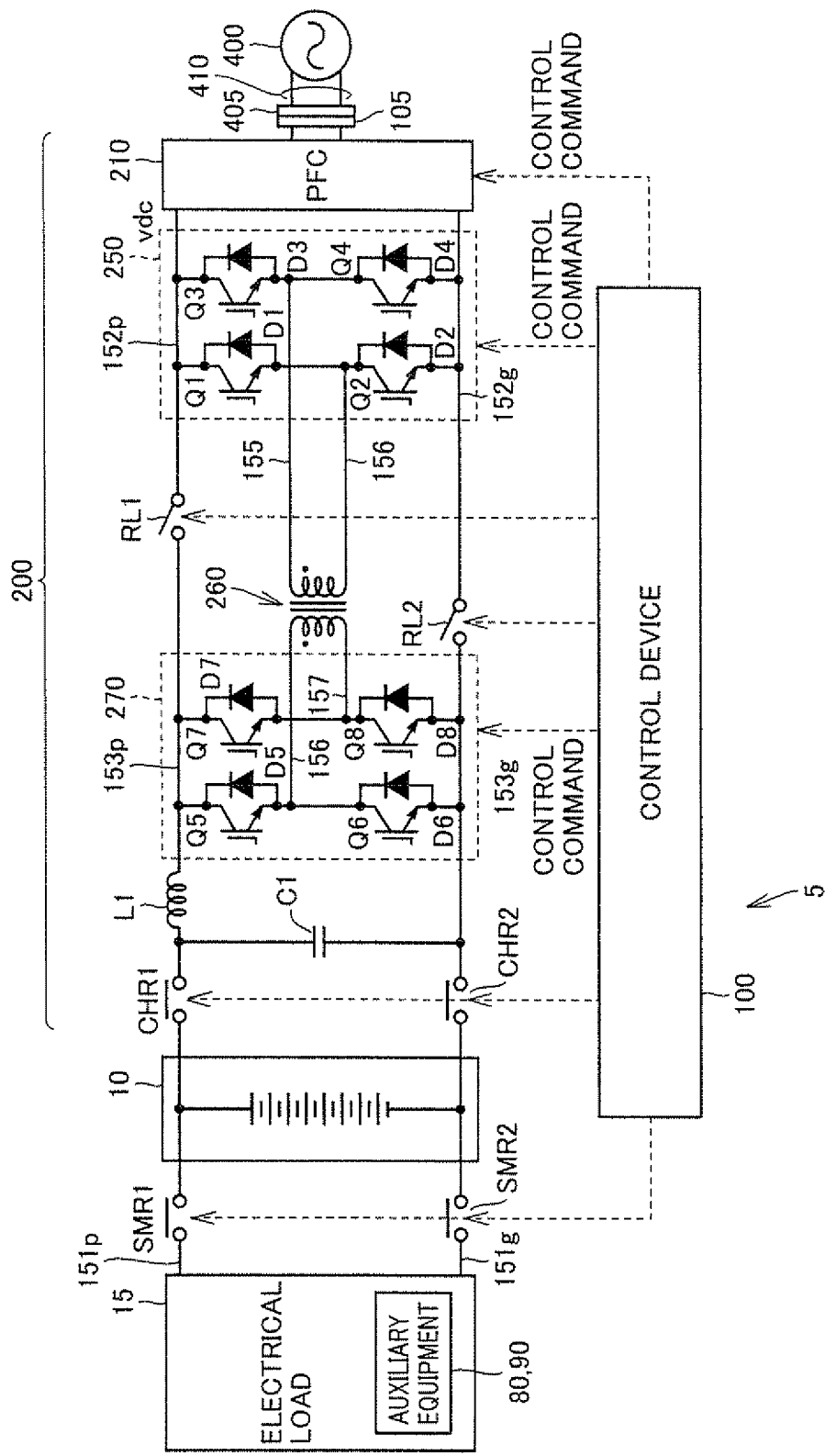
FIG. 7 is a block diagram of a configuration of an electrical system of an electric motored vehicle according to a second embodiment of the present invention.

FIG. 7 is a block diagram showing a configuration of an electrical system of an electric motored vehicle according to a second embodiment of the present invention.

When FIG. 7 is compared with FIG. 1, the second embodiment provides electric motored vehicle 5 having charger 200 with its relays arranged to be different than in the electric motored vehicle of the first embodiment shown in FIG. 1. More specifically, the second embodiment provides electric motored vehicle 5 dispensing with relay RL3. Furthermore, relay RL1 is connected between power supply line 152*p* and power supply line 153*p* whereas relay RL2 is connected between ground line 152*g* and ground line 153*g*. The FIG. 7 configuration has a remainder similar to that of the first embodiment (or FIG. 1), and accordingly, will not be described repeatedly in detail.

The second embodiment also provides an electric motored vehicle allowing the isolation type charging mode and the non isolation type charging mode to be selected, similarly as has been described with reference to the FIG. 4 steps S110-S130.

Figures 8, 9:
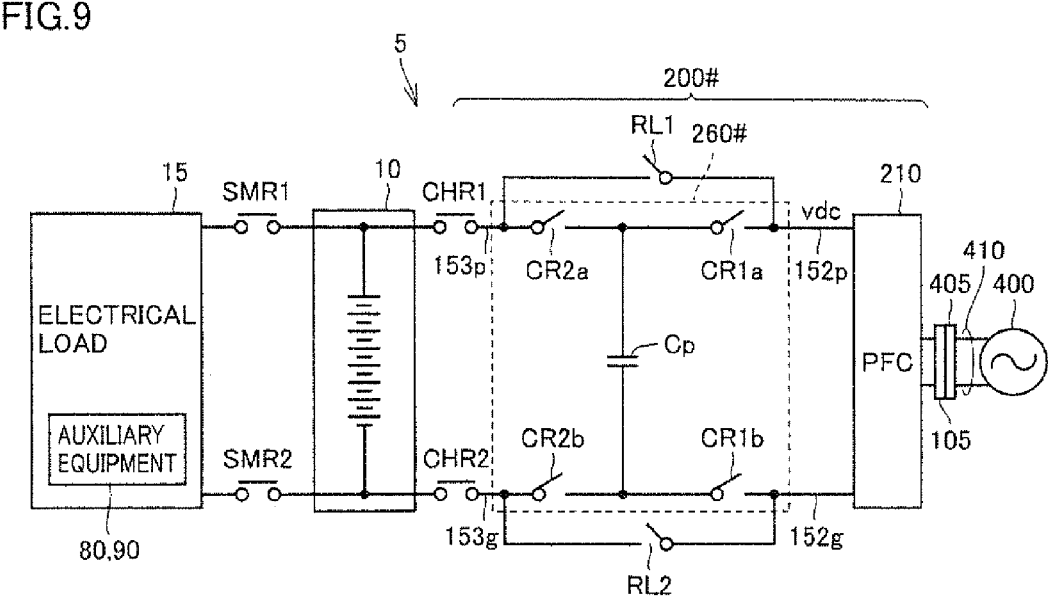
FIG. 8 illustrates how a charger in the electric motored vehicle of the second embodiment operates when a power storage device is externally electrically charged.
FIG. 9 is a block diagram of a configuration of an electrical system of an electric motored vehicle according to a third embodiment of the present invention.

FIG. 8 illustrates how charger 200 in the electric motored vehicle of the second embodiment operates when the battery is externally electrically charged (or in the isolation type charging mode/the non isolation type charging mode).

With reference to FIG. 7 and FIG. 8, in the isolation type charging mode, relays RL1, RL2 are turned off. More specifically in the second embodiment when the electric motored vehicle has its charger controlled, as described with reference to FIG. 4, steps S122, S124 are performed to turn off relays RL1, RL2.

Thus the isolation type charging mode provides an electric power conversion path similar to that of the isolation type charging mode in FIG. 1 to externally electrically charge main battery 10 with the electric power of external power supply 400. More specifically, AC-DC converter (or PFC circuit) 210, inverter 250, and converter 270 operate similarly as they do in the isolation type charging mode in the first embodiment.

In the non isolation type charging mode, in contrast, relays RL1, RL2 are turned on. More specifically in the second embodiment when the electric motored vehicle has its charger controlled, as described with reference to FIG. 4, steps S132, S134 are performed to turn on relays RL1, RL2.

Then in the non isolation type charging mode inverter 250 and converter 270 are not operated. More specifically, switching devices Q1-Q8 are all fixed at the off state. Accordingly, a mechanism converting voltage output from AC-DC converter (or PFC circuit) 210 (i.e., direct current voltage vdc) to voltage applied to electrically charge main battery 10, is not ensured. More specifically, AC-DC converter (or PFC circuit) 210 provides an output, which is in turn passed via relays RL1, RL2 and exactly serves as voltage and current to electrically charge main battery 10.

Accordingly in the non isolation type charging mode it is necessary that AC-DC converter 210 outputs voltage vdc controlled to have a level in voltage corresponding to voltage applied to electrically charge main battery 10. More specifically, voltage command value vdc* is set to be equivalent to charging voltage (Vb). Alternatively, it is necessary that AC-DC converter 210 outputs a current controlled to be a current suitable for electrically charging main battery 10. Controlling a current as described above can also be achieved by controlling current iL in PFC circuit 210, as has been described with reference to FIG. 2 and FIG. 3.

When electric motored vehicle 5 of the second embodiment is compared with that of the first embodiment, the former is not equipped with a voltage conversion function for voltage vdc output from AC-DC converter 210 and instead can have inverter 250 and converter 270 without having any of switching devices Q1-Q8 switched in externally electrically charging the battery in the non isolation type charging mode. As a result it is expected that the battery is externally electrically charged in the non isolation type charging mode more efficiently than it is in the first embodiment.

On the other hand, when system main relays SMR1, SMR2 are turned on to connect electrical load 15 to main battery 10 or similarly it is desired that electrical isolation from external power supply 400 is ensured, then, as has been done in the first embodiment, relays RL1, RL2 can be turned off to select the isolation type charging mode to ensure electrical isolation between external power supply 400 and electrical load 15.

Note that, as can be seen from the above description, the second embodiment provides electric motored vehicle 5 requiring that AC-DC converter 210 has a function to control voltage (or current) output therefrom, and it cannot be configured by a simple diode rectifier, as has been described in the first embodiment.

Third Embodiment

The first embodiment and its exemplary variation and the second embodiment exemplify an isolation scheme for charger 200 by isolation transformer 260. In a third embodiment will be described an exemplary configuration of the isolation scheme other than the isolation transformer.

FIG. 9 is a block diagram showing a configuration of an electrical system of an electric motored vehicle according to the third embodiment of the present invention.

When FIG. 9 is compared with FIG. 1, the third embodiment provides electric motored vehicle 5 different from that of the first embodiment in that charger 200 is replaced with a charger 200#. Other than charger 200#, a configuration similar to that of the first embodiment is provided, and accordingly, it will not be described repeatedly in detail.

With reference to FIG. 9, charger 200# includes AC-DC converter 210, a charge pump circuit 260# and relays RL1, RL2. In charger 200#, relays RL1, RL2 configure a "first switch".

AC-DC converter (or PFC circuit) 210 receives alternate current electric power transmitted from external power supply 400 to charging connector 105, converts the received alternate current electric power to direct current electric power (direct current voltage vdc), and outputs the direct current electric power on power supply line 152p and ground line 152g. Charge pump circuit 260# has a primary side connected to power supply line 152p and ground line 152g. Charge pump circuit 260# has a secondary side connected to power supply line 153p and ground line 153g. Power supply line 153p and ground line 153g are electrically connected via charging relays CHR1, CHR2 to main battery 10 at a positive terminal and a negative terminal, respectively.

Charge pump circuit 260# includes a capacitor Cp, relays CR1a, CR1b provided at the primary side, and relays CR2a, CR2b provided at the secondary side.

Charge pump circuit 260# has the primary side with relay CR1a connected between the capacitor Cp positive terminal and power supply line 152p, and relay CR1b connected between the capacitor Cp negative terminal and ground line 152g. In other words, relays CR1a, CR1b correspond to a "third switch".

Similarly, charge pump circuit 260# has the secondary side with relay CR2a connected between the capacitor Cp positive terminal and power supply line 153p, and relay CR2b connected between the capacitor Cp negative terminal and ground line 153g. In other words, relays CR2a, CR2b correspond to a "fourth switch".

Relay RL1 is connected between power supply line 152p and power supply line 153p so as to form a conduction path bypassing relays CR1a, CR2a. Similarly, relay RL2 is connected between ground line 152g and ground line 153g so as to form a conduction path bypassing relays CR1b, CR2b.

Note that although not shown, the FIG. 9 configuration also has relays CR1a, CR1b, CR2a, CR2b, relays R1, RL2, system main relays SMR1, SMR2, and charging relays CHR1, CHR2 turned on (or switched on) and off (or switched off), as controlled by control device 100 (FIG. 1).

Figure 10:
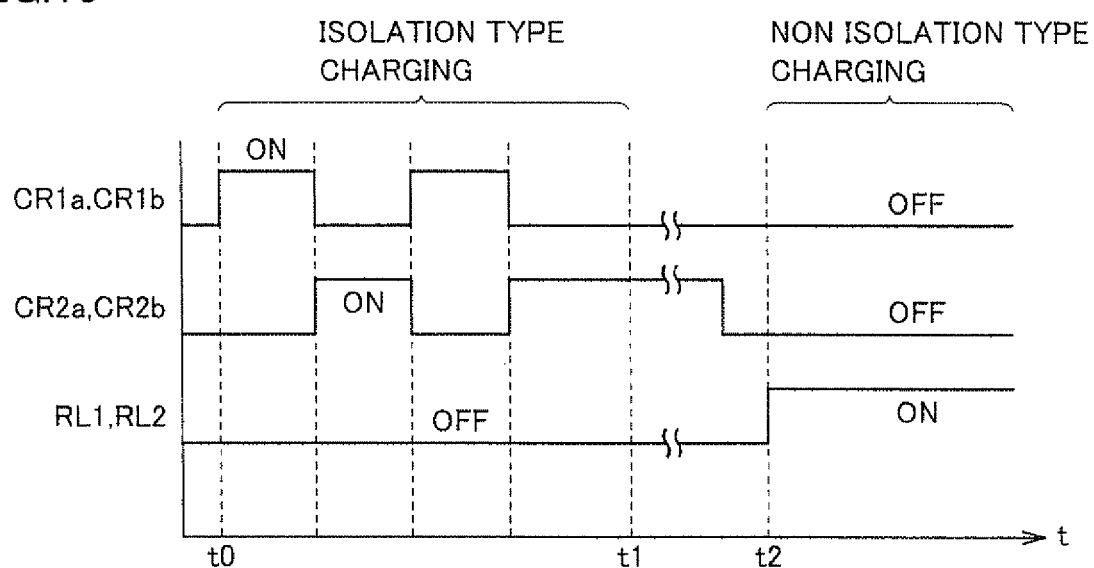
FIG. 10 is a waveform diagram for illustrating how a charger operates in the electric motored vehicle of the third embodiment when a power storage device is externally electrically charged.

FIG. 10 is a waveform diagram for illustrating how the charger operates in the electric motored vehicle of the third embodiment when the power storage device is externally electrically charged, more specifically for illustrating how the FIG. 9 relays are turned on/off.

With reference to FIG. 10, between time t0 and time t1, the isolation type charging mode is selected, and after time t2, the non isolation type charging mode is selected.

When the isolation type charging mode is selected, relays CR1a, CR1b and relays CR2a, CR2b are alternately and complementarily turned on/off. As a result, the on periods of relays CR1a, CR1b and the on periods of relays CR2a, CR2b are provided alternately. On the other hand, relays RL1, RL2 are fixed at the off state.

While relays CR1a, CR1b are turned on, capacitor Cp is electrically charged by voltage vdc output from AC-DC converter 210. At the time, capacitor Cp is electrically disconnected from power supply line 153p and ground line 153g (or the charge pump circuit 260# secondary side).

On the other hand, while relays CR2a, CR2b are turned on, main battery 10 is electrically charged by electric power charged to capacitor Cp. At the time, capacitor Cp is electrically disconnected from power supply line 152p and ground line 152g (i.e., the charge pump circuit 260# primary side).

As a result, charge pump circuit 260# can have its primary side (or power supply line 152p and ground line 152g) and its secondary side (or power supply line 153p and ground line 153g) electrically isolated, and in that condition can transmit electrical energy from the primary side to the secondary side. In other words, charge pump circuit 260# configures an "isolation scheme".

Thus charger 200# in the isolation type charging mode can form an electric power conversion path extending through charge pump circuit 260# to provide electrical isolation between external power supply 400 and main battery 10. As a result, while external power supply 400 is electrically isolated from main battery 10, main battery 10 can be externally electrically charged. Thus, while system main relays SMR1, SMR2 are turned on, electrical isolation can be ensured between electrical load 15 and external power supply 400.

In contrast, after time t2, or in the non isolation type charging mode, relays CR1a, CR2a and relays CR1b, CR2b are fixed at the off state. On the other hand, relays RL1, RL2 are fixed at the on state.

Thus in the non isolation type charging mode charger 200# receives electric power from external power supply 400 and converts the received electric power to electric power via an electric power conversion path bypassing charge pump circuit 260# and thus providing electrical connection between external power supply 400 and main battery 10 to electrically charge main battery 10.

Charge pump circuit 260# in the isolation type charging mode causes a switching loss as relays CR1a, CR2a, CR1b, CR2b are turned on/off. In the non isolation type charging mode, in contrast, charge pump circuit 260# is bypassed and accordingly, relays CR1a, CR2a, CR1b, CR2b are fixed at the off state, and such a switching loss is not caused. That is, the non isolation type charging mode can prevent charge pump circuit 260# (or the isolation scheme) from causing a loss, and thus allows the battery to be externally electrically charged more efficiently than the isolation type charging mode.

In particular, when system main relays SMR1, SMR2 are turned off to ensure electrical isolation between main battery 10 and electrical load 15, the non isolation type charging mode ensures electrical isolation between electrical load 15 and external power supply 400, and in that condition, allows the battery to be externally electrically charged more efficiently.

Note that the third embodiment provides charger 200# that is not equipped with a voltage conversion function providing voltage conversion from voltage output from AC-DC converter (or PFC circuit) 210 (or direct current voltage vdc) to voltage applied to electrically charge main battery 10. Accordingly, the isolation type charging mode and the non isolation type charging mode each require that AC-DC conversion circuit (or PFC circuit) 210 outputs voltage vdc controlled to have a level in voltage corresponding to voltage applied to electrically charge main battery 10. In other words, voltage command value vdc* is set to be equivalent to charging voltage (Vb).

Furthermore in the non isolation type charging mode AC-DC converter (or PFC circuit) 210 provides an output which is in turn passed through relays RL1, RL2 and thus exactly serves as voltage and current to electrically charge main battery 10, and accordingly, it is necessary that AC-DC converter 210 be controlled similarly as done in the second embodiment.

Thus the third embodiment provides electric motored vehicle 5 having charge pump circuit 260# applied thereto as an "isolation scheme" to allow the isolation type charging mode and the non isolation type charging mode to be selectively used similarly as done in the first embodiment and its exemplary variation and the second embodiment. In other words, the third embodiment can provide electric motored vehicle 5 that allows charge pump circuit 260# (or an isolation scheme) to be passed through to provide an electric power conversion path ensuring electrical isolation in externally electrically charging a battery (i.e., the isolation type charging mode) and charge pump circuit 260# (or the isolation scheme) to be bypassed to provide an electric power conversion path giving priority to high efficiency in externally electrically charging the battery (i.e., the non isolation type charging mode) to be selectively applicable thereto.

Note that the third embodiment also allows electric motored vehicle 5 to have the charger controlled as shown in FIG. 4. More specifically, the isolation type charging mode and the non isolation type charging mode are selected in steps identical to the FIG. 4 steps S110-S130. Furthermore, steps S122, S124 are only required to be modified to turn off relays RL1 and RL2, and steps S132, S134 are only required to be modified to turn on relays RL1 and RL2.

Thus, switching between the isolation type charging mode and the non isolation type charging mode, as ganged with system main relays SMR1, SMR2 being turned on/off to control electrical connection between main battery 10 and electrical load 15, ensures electrical isolation between vehicle-mounted electronics (or electrical load 15) and external power supply 400, and in that condition, allows the battery to be externally electrically charged efficiently.

It should be understood that in the first embodiment and its exemplary variation and the second embodiment charger 200 has a configuration, AC-DC converter 210, inverter 250 and converter 270 have a configuration, in particular, that is not limited to those exemplarily shown in FIGS. 1, 2, 6, and 7. For example, AC-DC converter 210 may have a circuit configuration different from the FIG. 2 example as long as it is a power converter receiving power supply voltage vac from external power supply 400 and capable of converting power supply voltage vac to direct current voltage. Furthermore, inverter 250 and converter 270 may have a circuit configuration different from the FIG. 1 example or the like as long as they are capable of equivalent DC-AC conversion and AC-DC conversion when an electric power conversion path via isolation transformer 260 is formed (i.e., the isolation type charging mode) and they are also capable of configuring a non isolation type direct current voltage converter using smoothing inductor L1 when an electric power conversion path bypassing isolation transformer 260 is formed.

It should be understood that the embodiments disclosed herein are illustrative and non-restrictive in any respect. The scope of the present invention is defined by the terms of the claims, rather than the description above, and is intended to include any modifications within the scope and meaning equivalent to the terms of the claims.

INDUSTRIAL APPLICABILITY

The present invention is applicable to hybrid vehicles, electric vehicles which do not have an engine mounted therein, fuel cell vehicles and the like electric motored vehicles having a power storage device mounted therein and chargeable by a power supply external to the vehicle.

REFERENCE SIGNS LIST

5: electric motored vehicle; 10: main battery; 15: electrical load; 30: motor generator; 40: power transmission gear; 50: driving wheel; 60: DCDC converter; 70: auxiliary battery; 80: auxiliary equipment (of high voltage system), 90: auxiliary equipment (of low voltage system), 100: control device (ECU), 105, 405: charging connector; 151g, 152g, 153g: ground line; 151p, 152p, 153p: power supply line; 154-157: line (isolation transformer), 200, 200#: charger, 210: AC-DC converter (or PFC circuit), 212: rectifier; 250: DC-AC converter (inverter), 260#: charge pump circuit; 260: isolation transformer; 270: AC-DC converter (converter), 400: external power supply; 410: charging cable; C0, C1, C2: smoothing capacitor; CHR1, CHR2: charging relay; CR1a, CR1b: relay (third switch), CR2a, CR2b: relay (fourth switch), Cp: capacitor; D1-D9: anti parallel diode; D10: diode; L1: smoothing inductor; L2: inductor; Q1-Q9: power semiconductor switching device; RL1-RL3: relay (first switch), SMR1, SMR2: system main relay (second switch), Vb: direct current voltage (main battery), iL*: target current; iL: current; iLA: amplitude (target current), iac: power supply current; vac: power supply voltage; vdc: voltage command value; vdc: direct current voltage

The invention claimed is:

1. An electric motored vehicle comprising:
   a power storage device for storing electric power input/output to/from a vehicle driving electric motor; and
   a charger for electrically charging said power storage device by an external power supply, said charger including:
   a first electric power conversion path extending through an isolation scheme to provide electrical isolation between said external power supply and said power storage device, and receiving electric power from said external power supply and converting the received electric power through said isolation scheme to electric power to electrically charge said power storage device, said isolation scheme having a primary side and a secondary side and transmitting electrical energy with said primary side and said secondary side electrically isolated from each other;
   a second electric power conversion path bypassing said isolation scheme and providing electrical connection between said external power supply and said power storage device, and receiving electric power from said external power supply and converting the received electric power to electric power to electrically charge said power storage device; and
   a first switch operative in externally electrically charging said power storage device for selectively forming one of said first electric power conversion path and said second electric power conversion path.

2. The electric motored vehicle according to claim 1, further comprising:
   an electrical load operating on electric power of said power storage device: and
   a second switch connected between said power storage device and said electrical load, wherein said charger selects one of said first electric power conversion path and said second electric power conversion path, as corresponding to said second switch being turned on/off.

3. The electric motored vehicle according to claim 2, wherein said first switch is controlled to allow said charger to have said first electric power conversion path selected when said second switch is turned on and to have said second electric power conversion path selected when said second switch is turned off.

4. The electric motored vehicle according to claim 1, wherein said isolation scheme is configured of an isolation transformer transmitting electrical energy between said primary side and said secondary side through electromagnetic induction.

5. The electric motored vehicle according to claim 4, wherein:
   said charger further includes
   a first power converter for receiving electric power from said external power supply and converting the received electric power to direct current voltage for output between a first power supply line and a first ground line,
   a second power converter for converting said direct current voltage to alternate current voltage for output to said isolation transformer at said primary side when said first electric power conversion path is selected,
   a third power converter for converting alternate current voltage of said isolation transformer on said secondary side to voltage for output between a second power supply line and a second ground line to electrically charge said power storage device when said first electric power conversion path is selected, and
   a smoothing inductor connected between said second power supply line and said power storage device;
   said second power converter and said third power converter are each configured with a plurality of switching devices included therein;
   said third power converter does not operate when said second electric power conversion path is selected; and
   when said second electric power conversion path is selected, said second power converter operates such that some of said plurality of switching devices and said smoothing inductor configure a non isolation type chopper circuit receiving said direct current voltage from said first power converter and converting said direct current voltage to voltage applied to electrically charge said power storage device.

6. The electric motored vehicle according to claim 5, wherein:
   said first switch has
   a first switch element connected between said primary side of said isolation transformer and said second power supply line,
   a second switch element connected between said first ground line and said second ground line, and
   a third switch element inserted and thus connected in a conduction path associated with said primary side of said isolation transformer;
   said first switch element and said second switch element are turned off when said first electric power conversion path is selected, and said first switch element and said second switch element are turned on when said second electric power conversion path is selected; and
   said third switch element is turned on when said first electric power conversion path is selected, and said third switch element is turned off when said second electric power conversion path is selected.

7. The electric motored vehicle according to claim 5, wherein:
   said first switch has
   a first switch element connected between one line associated with said primary side of said isolation transformer and said second power supply line, a second switch element connected between the other line associated with said primary side of said isolation transformer and said second ground line, and
a third switch element inserted and thus connected in a conduction path associated with said primary side of said isolation transformer;
said first switch element and said second switch element are turned off when said first electric power conversion path is selected, and said first switch element and said second switch element are turned on when said second electric power conversion path is selected;
said third switch element is turned on when said first electric power conversion path is selected, and said third switch element is turned off when said second electric power conversion path is selected; and
when said second electric power conversion path is selected, said second power converter operates to configure said non isolation type chopper circuit and also electrically connect said first ground line and said second ground line together.

8. The electric motored vehicle according to claim 4, wherein:
said charger further includes
a first power converter for receiving electric power from said external power supply and converting the received electric power to direct current voltage in accordance with a voltage command value for output between a first power supply line and a first ground line,
a second power converter configured with a plurality of switching devices included therein for converting said direct current voltage to alternate current voltage for output to said isolation transformer at said primary side when said first electric power conversion path is selected,
a third power converter for converting alternate current voltage of said isolation transformer on said secondary side to voltage for output between a second power supply line and a second ground line to electrically charge said power storage device when said first electric power conversion path is selected, and
a smoothing inductor connected between said second power supply line and said power storage device;
when said second electric power conversion path is selected, said first switch electrically connects between said first power supply line and said second power supply line and between said first ground line and said second ground line;
said second power converter and said third power converter do not operate when said second electric power conversion path is selected; and
when said second electric power conversion path is selected, said voltage command value for said first power converter is set to correspond to the voltage applied to electrically charge said power storage device.

9. The electric motored vehicle according to claim 8, wherein said first switch has:
a first switch element connected between said first power supply line and said second power supply line, and turned off when said first electric power conversion path is selected and turned on when said second electric power conversion path is selected; and
a second switch element connected between said first ground line and said second ground line and turned off when said first electric power conversion path is selected and turned on when said second electric power conversion path is selected.

10. The electric motored vehicle according to claim 1, wherein said isolation scheme includes:
a capacitor;
a third switch provided between opposite polar terminals of said capacitor and said primary side; and
a fourth switch provided between said opposite polar terminals of said capacitor and said secondary side.

11. The electric motored vehicle according to claim 10, wherein:
said charger further includes a first power converter configured to receive electric power from said external power supply, convert the received electric power to direct current electric power and output the direct current electric power to said isolation scheme at said primary side for electrically charging said power storage device;
said power storage device is electrically connected to said isolation scheme at said secondary side in said externally electrically charging said power storage device; and
said first switch is arranged to bypass said third switch and said fourth switch to electrically connect said primary side of said isolation scheme and said secondary side of said isolation scheme together.

12. The electric motored vehicle according to claim 11, wherein:
said first switch is fixed at an off state when said first electric power conversion path is selected, and said first switch is fixed at an on state when said second electric power conversion path is selected;
said third switch is turned on/off alternately with and complementarily to said fourth switch when said first electric power conversion path is selected, and said third switch is fixed at the off state when said second electric power conversion path is selected; and
said fourth switch is turned on/off alternately with and complementarily to said third switch when said first electric power conversion path is selected, and said fourth switch is fixed at the off state when said second electric power conversion path is selected.

13. A method for controlling an electric motored vehicle including a power storage device for storing electric power input/output to/from a vehicle driving electric motor, and a charger for electrically charging said power storage device by an external power supply, said charger being configured to have electric power conversion paths extending from said external power supply to said power storage device switched as a first switch is controlled, comprising the steps of:
selecting one of a first charging mode and a second charging mode depending on said electric motored vehicle's status, said first charging mode allowing said external power supply and said power storage device to be electrically isolated from each other in electrically charging said power storage device, said second charging mode allowing said external power supply and said power storage device to be electrically connected to each other in electrically charging said power storage device;
controlling, when said first charging mode is selected, said first switch to form a first electric power conversion path extending through an isolation scheme, and receiving electric power from said external power supply and converting the received electric power through said isolation scheme to electric power to electrically charge said power storage device, said isolation scheme having a primary side and a secondary side and transmitting electrical energy with said primary side and said secondary side electrically isolated from each other; and controlling, when said second charging mode is selected, said first switch to form a second electric power conversion path bypassing said isolation scheme, and receiving electric power from said external power supply and converting the received electric power to electric power to electrically charge said power storage device.

14. The method for controlling an electric motored vehicle according to claim 13, said electric motored vehicle further including an electrical load operating on electric power of said power storage device and a second switch connected between said power storage device and said electrical load, wherein the step of selecting is performed to select one of said first charging mode and said second charging mode, as corresponding to said second switch being turned on/off.

15. The method for controlling an electric motored vehicle according to claim 14, wherein the step of selecting is performed to select said first charging mode when said second switch is turned on and to select said second charging mode when said second switch is turned off.

* * * * *